United States Patent
Ferlitsch (10) Patent No.: US 6,672,212 B1
(45) Date of Patent: Jan. 6, 2004

(54) SINGLE PRINT JOB EMULATION OF MULTIPLE TIFF FILES

(75) Inventor: Andrew R. Ferlitsch, Tigard, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 10/234,490

(22) Filed: Sep. 3, 2002

(51) Int. Cl.[7] .................................................. B41F 1/54
(52) U.S. Cl. ..................... 101/484; 400/76; 382/306; 358/1.18; 707/104.1; 715/517; 715/522; 715/500.1
(58) Field of Search .................. 101/481, 484; 400/61, 62, 67, 73, 76; 382/305, 306; 358/1.13, 1.15, 1.18; 707/104.1; 715/522, 517, 500.1

(56) References Cited

U.S. PATENT DOCUMENTS

| | | | |
|---|---|---|---|
| 5,179,649 A | * 1/1993 | Masuzaki et al. | 358/118 |
| 5,485,568 A | * 1/1996 | Venable et al. | 715/500.1 |
| 6,064,397 A | * 5/2000 | Herregods et al. | 345/630 |
| 6,088,710 A | * 7/2000 | Dreyer et al. | 715/517 |
| 6,205,452 B1 | * 3/2001 | Warmus et al. | 715/500 |
| 6,332,149 B1 | * 12/2001 | Warmus et al. | 715/517 |
| 6,427,032 B1 | * 7/2002 | Irons et al. | 382/306 |
| 2002/0021902 A1 | * 2/2002 | Hosoda et al. | 396/429 |
| 2002/0044298 A1 | * 4/2002 | Kaneko et al. | 358/1.15 |
| 2002/0075574 A1 | * 6/2002 | Wright et al. | 358/1.15 |
| 2002/0131075 A1 | * 9/2002 | Kremer | 358/1.15 |
| 2002/0178950 A1 | * 12/2002 | Delhoune et al. | 101/481 |
| 2002/0191220 A1 | * 12/2002 | Czyszczewski et al. | 358/1.18 |

* cited by examiner

*Primary Examiner*—Eugene H. Eickholt
(74) *Attorney, Agent, or Firm*—Marger Johnson & McCollom

(57) ABSTRACT

Methods and apparatus for printing multiple TIFF files as a single print job are disclosed. Multiple-TIFF-file data is concatenated into a single stream, without completely merging the data into a single TIFF file with all byte offsets affected. Instead, tag data is used to either delineate which data comes from which files (allowing offset pointers to be offset or reset), or to set an offset adjustment value to interpret byte offsets that do not refer to the beginning of the file stream. A PDL interpreter and/or a TIFF reader on the printer processes the concatenated data, allowing the use of advanced print features and efficient device utilization when multiple TIFF files are printed together.

30 Claims, 5 Drawing Sheets

SINGLE PRINT JOB EMULATION OF MULTIPLE TIFF FILES

FIELD OF THE INVENTION

The present invention relates generally to printing of data stored in TIFF files, and more particularly to methods and system components for printing multiple TIFF files in a single print job.

BACKGROUND OF THE INVENTION

The Tagged Image File Format, usually referred to by the acronym TIFF, is detailed in current form in the specification TIFF: Revision 6.0, Adobe Developers Assoc., Jun. 3, 1992. TIFF is but one of many image file formats in existence. TIFF is particularly popular as a scanned image storage format (for instance the U.S. Patent Office stores patent pages for online retrieval as TIFF files). TIFF incorporates several features that have contributed to its popularity, including a flexible file structure, an extendable design, and portability features.

A TIFF file must contain at least three data components, an Image File Header, an Image File Directory (IFD) for an image, and image data corresponding to that IFD. The file may contain additional IFD/image data pairings, as TIFF allows more than one image per file.

The Image File Header (IFH) must reside in the first eight bytes of the file. The IFH contains a byte-ordering field, a version field (fixed to a binary representation of the decimal value 42), and a pointer to the first (or only) IFD present in the file. (Note that the first IFD is logically the first IFD—it may in fact be positioned anywhere after the header within the file stream, including after IFDs for later images.) A TIFF reader follows the first IFD pointer to locate the first IFD in the file.

The IFD stores Directory Entries (DEs) that describe various parameters associated with a TIFF image. Each IFD begins with a two-byte count of the number of DEs in that IFD. The DEs follow thereafter, each DE occupying 12 bytes. Immediately following the last DE is a four-byte pointer to the next IFD in the file. The next IFD pointer is a NULL pointer if no other IFDs exist in the file.

Directory Entries can store a wide range of information about an image. Each DE begins with a tag field. The numeric value of the tag is assigned to a particular image parameter, i.e., tag 258 indicates that the DE describes the number of bits/sample, a DE with tag 256 indicates image width, a DE with tag 257 indicates image length, and tag 273 indicates that the DE points to file offset pointers for the image. In addition to standard DE tags, vendors may request and be assigned "private" tags, which will generally be ignored by other vendors' TIFF readers.

After the DE tag, a type field describes the type of data stored in the DE, a length field describes the number of data entries stored in the DE, and a value/offset field stores either the DE value (if less than or equal to four bytes in length), or a pointer to a location where the DE value is stored.

TIFF capability is generally present in multifunction printers (MFPs) that combine a scanning unit and a printing unit in one device. The scanning unit typically translates scanned images into a TIFF stream. Most MFPs have a "copy" mode that operates by scanning an image with the scanning unit, and then sending the TIFF output stream from the scanning unit directly to the printing unit. The printing unit of such a device preferably supports TIFF input without additional rasterization, and can thus efficiently print the scanned document.

MFPs often contain a Page Description Language (PDL) interpreter, such as a Postscript or PCL (Printer Control Language) interpreter, that parses and rasterizes print data from, e.g., a remote client. When the MFP device is interpreting PDL input, print engine performance is degraded, as the print engine must wait for rasterization of the PDL data.

Some MFP devices contain a TIFF bypass pipeline within the PDL interpreter. The PDL interpreter accepts TIFF data and passes that data through the bypass directly to the print engine, just as the scanning unit does. When a client document is already stored in TIFF format (e.g., stored faxes, document scans, digital images), maximum printing engine performance can be obtained by submitting the TIFF document directly to the printer. In such a case, neither the client, nor the printer, nor any intervening print server need perform document rasterization, and printing can proceed most efficiently.

SUMMARY OF THE INVENTION

It is recognized herein that the particular format of TIFF files limits TIFF document printing, in a prior art printer TIFF bypass system, to one TIFF file per print job. In circumstances where it is desirable that multiple TIFF files be printed together (e.g., the files are related), the one-file-per-print-job limitation can sap the advantages from TIFF bypass printing. A human user may have to expend additional effort to create the separate print jobs, possibly having to re-enter print options for each page. Each print job will reset the printer, causing interfile print engine delays and reducing engine performance. With a shared printer, other print jobs can get interleaved between the separate TIFF print jobs. And some print options simply will not work right across multiple jobs, e.g., multiple collated copies, stapling, duplex printing, etc.

One solution to this problem is to simply merge multiple TIFF files into a single multi-image TIFF file or data stream. The merged TIFF file can be presented as a single TIFF job to the print engine, avoiding some of the problems above. But such an approach is not without its own problems. First, additional human effort may be required to merge the files, and substantial additional computer resources are required to complete the merge. Each TIFF file must be parsed and edited to recalculate all internal pointer values to be consistent with the position of that file within the merged file. In addition to the computational work this creates, it can also result in significant problems. For instance, the merged file may be too large for the TIFF pointer size, and/or a merging program may not recognize proprietary-tagged pointers and will thus not adjust them properly. In short, the effort required and attendant risks may not be warranted for a transient file such as a printer spool file.

In accordance with the present disclosure, several related approaches to printing multiple TIFF files within a single print job are disclosed. Common to each approach is a step of concatenating the multiple TIFF files into the print job, or more specifically, concatenating the image and image pointer data without disturbing their position within each file (some embodiments require some minimal IFD manipulation). Also common is the step of adding tag data to the print job—the tag data contains information that allows the printer to recognize that the data came from multiple TIFF files, and process each TIFF file section. The tag data may be, e.g., entered in a printer job language, or contained in additional DEs added to each TIFF file. Such tag data can generally be added without extensive parsing and computation on the individual TIFF files, and preferably avoids the problems inherent in merging multiple TIFF files.

Related methods for processing a print job containing such concatenated TIFF file data and tag data are disclosed. Image data corresponding to the first of several TIFF files is rendered. Tag data within the print job is recognized, the tag data indicating that the print job TIFF data continues beyond the data from the first TIFF file. Print parameters are adjusted according to the tag data, thus allowing TIFF reading of data corresponding to the next TIFF file, and then the next TIFF file is rendered.

A print device capable of rendering TIFF data is also disclosed. The print engine in this device has a TIFF reader and the capability to process a print job comprising image and image pointer data from multiple concatenated TIFF files and tags instructing the print engine how to read the concatenated TIFF data. The device also has a marking engine to print processed data received from the print engine.

A print assistant (e.g., an executable print client process) is also disclosed. This print assistant comprises a TIFF data concatenator to place TIFF data from multiple TIFF files in a common print data stream, and a tag insertion module to place tags in the print data stream. The tags contain instructions that a print engine will need to read the concatenated TIFF data.

BRIEF DESCRIPTION OF THE DRAWING

The invention may be best understood by reading the disclosure with reference to the drawing, wherein.

DETAILED DESCRIPTION OF THE EMBODIMENTS

Three primary method embodiments (each of which can be modified within the scope of the invention) are presented herein. In each embodiment, emphasis has been placed on minimal manipulation of TIFF file data by the client that creates a multiple-TIFF-file ("multiTIFF") print job. Each embodiment takes a different approach, but all operate in a manner that does not require comprehension of DE data—or manipulation of DE data—and thus all are desirable in that a necessity for complex TIFF read/write capability and computation is avoided.

Figure 1:
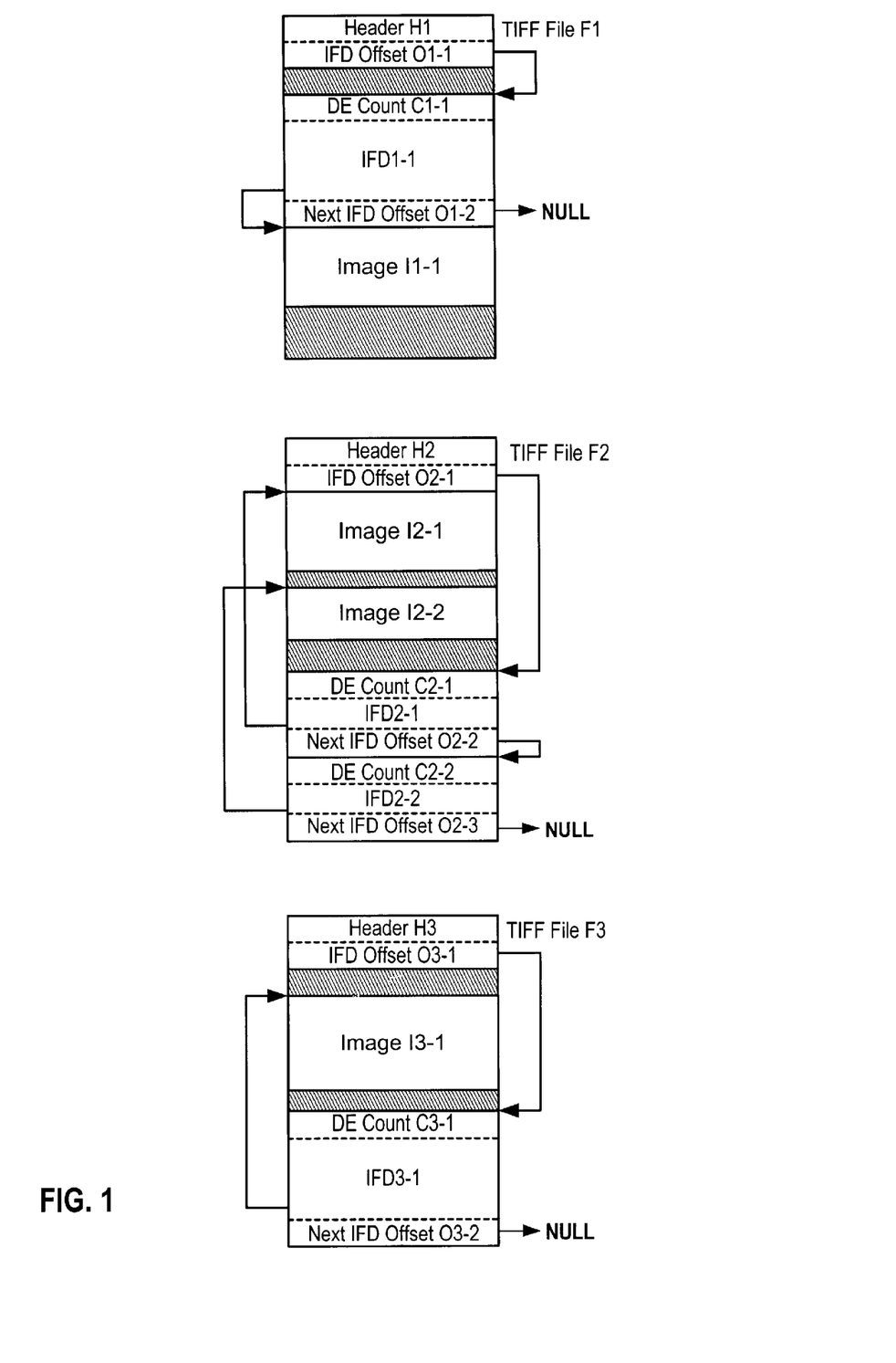
FIG. 1 illustrates the basic structure of three TIFF files, these structures to be used in examples for each detailed embodiment.

As an aid to understanding the embodiments, a generalized set of TIFF files {F1, F2, F3} is presented in FIG. 1 and used repeatedly in the description of the embodiments. Although three files are shown, the methods described herein could be applied to any reasonable number of TIFF files.

TIFF file F1 starts with a header H1, which includes an IFD Offset O1-1 that points to IFD1-1. Within IFD1-1, DE Count C1-1 informs a TIFF reader of the number of DE entries in IFD1-1, one DE entry points to Image I1-1, and the last DE is followed by a Next IFD Offset O1-2 that contains a NULL value (since file F1 contains only one image). The shaded areas of file F1 could be unused, or could contain other data structures used to interpret or describe Image I1-1.

TIFF file F2 is delineated using similar nomenclature. File F2, however, contains two IFDs and two images. Thus IFD Offset O2-1 point to IFD2-1, Next IFD Offset O2-2 points to IFD2-2, and Next IFD Offset O2-3 contains a NULL value. Note that the structure of file F2 illustrates the flexibility of TIFF, as both images precede both IFDs in file F2.

TIFF file F3 is similar in structure to TIFF file F1.

The first primary embodiment is comprehended for use with a PDL interpreter (Printer Job Language ("PJL") is an exemplary PDL and is used in this example). The basic framework of this embodiment generates a MultiTIFF print job containing a set of PDL printer control commands, including TIFF tags, with TIFF data embedded between the PDL commands.

Figure 2:
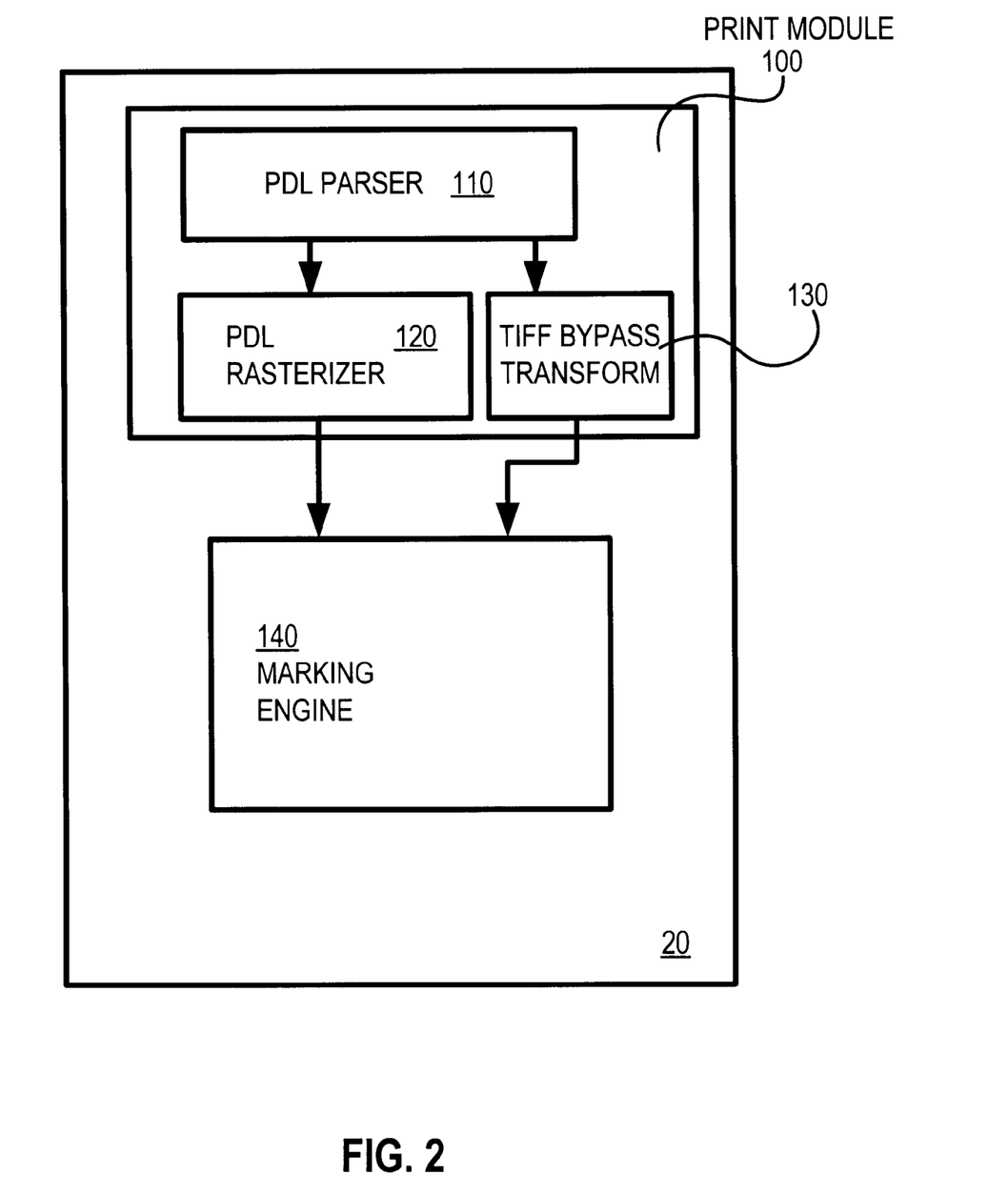
FIG. 2 contains a block diagram for portions of a printer that contains a PDL interpreter with a TIFF bypass transform.

FIG. 2 shows a block diagram for the pertinent sections of a MultiFunction Printer 20 that can accept a PDL/TIFF MultiTIFF print job. Print module 100 contains a PDL parser 110, a PDL rasterizer 120, and a TIFF bypass transform 130. Print module 100 supplies rasterized data to marking engine 140 for printing.

PDL parser 110 decides which portion or portions of a PDL print job should pass to rasterizer 120, and which portions, if any, can be submitted to TIFF bypass transform 130. Parser operation can be understood with two simple examples using PJL commands. For a single TIFF file, an example print job could contain the following:

| | |
|---|---|
| UEL | //Universal Exit Language |
| @PJL RESET | //Printer Reset |
| @PJL SET DUPLEX | //First Print Job Directive |
| ... | |
| @PJL SET COLLATION | //Last Print Job Directive |
| @PJL ENTER LANGUAGE=TIFF | //Begin TIFF data interpretation |
| <TIFF data> | //TIFF data |

The @PJL ENTER LANGUAGE=TIFF command signals the PJL interpreter that what follows is TIFF data that should not be interpreted, but sent instead through the TIFF bypass. In this example, the end of the TIFF data stream is coincident with the end of the print job, and thus the parser, upon parsing the ENTER LANGUAGE command, merely dumps the remainder of the job to the TIFF bypass transform.

In a multiTIFF scenario, the parser cannot just dump all data after the ENTER LANGUAGE command into the TIFF bypass transform, as the transform would only recognize the first set of TIFF file data and ignore the rest (the first NULL Next IFD pointer would cause the TIFF reader to assume it had reached the file end). In accordance with this embodiment, then, several disclosed methods will adequately delineate the multiple TIFF file data.

Figure 3:
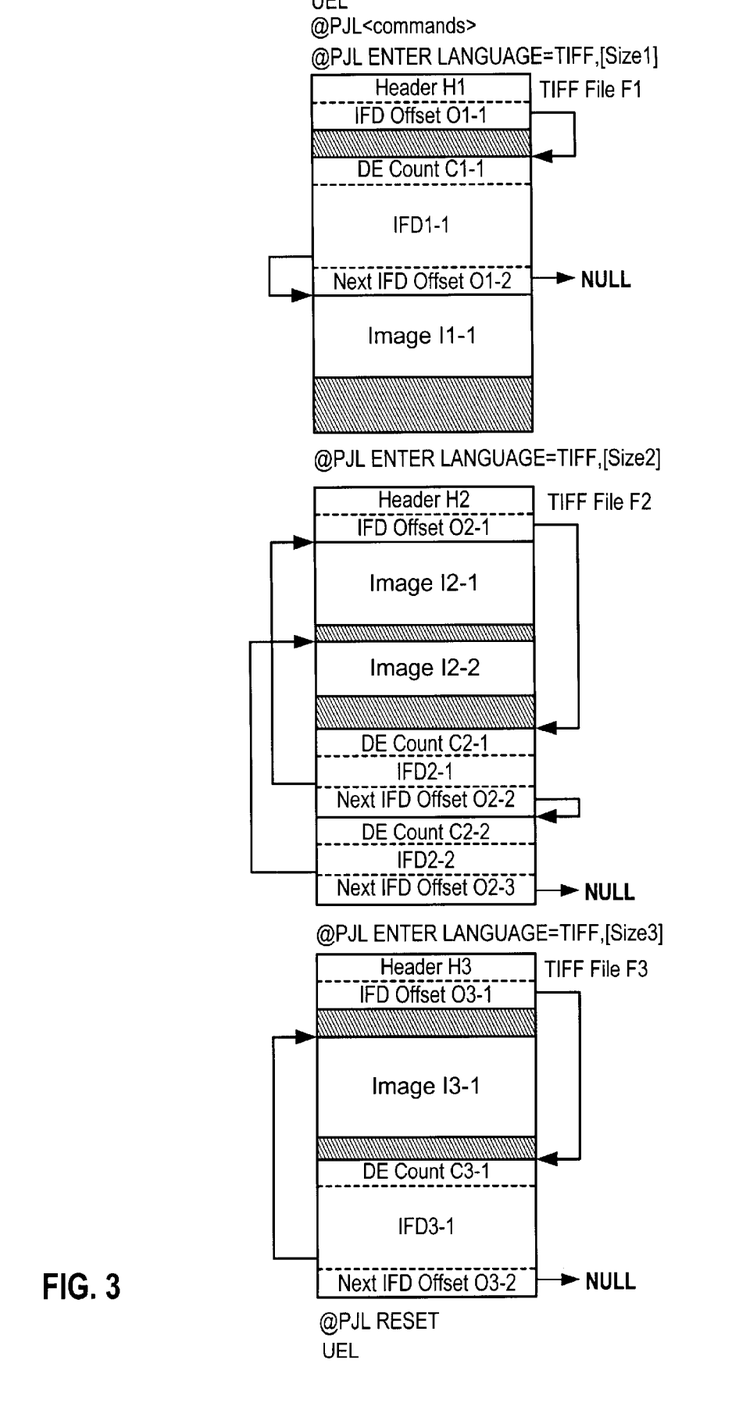
FIGS. 3 to 5 show, for three respective embodiments, a single print job containing three concatenated TIFF files and tag structures added to create a MultiTIFF file.

According to one method, shown in FIG. 3, an ENTER LANGUAGE=TIFF command precedes data from each of TIFF files F1, F2, and F3. Each ENTER LANGUAGE command contains a size option that specifies the size, in bytes, of the immediately following TIFF data taken from a TIFF file. Upon parsing the ENTER LANGUAGE command, the PDL parser 110 sends the next size bytes to TIFF bypass transform 130, and then exits TIFF mode and begins interpreting data again. As each subsequent ENTER LANGUAGE=TIFF command is parsed, additional data is sent to the bypass transform. Because the print module goes in and out of TIFF mode between data segments representing separate TIFF files, the TIFF bypass resets its pointers and thus interprets the next TIFF segment correctly. But since the TIFF files are linked in a common print job, that job as a whole can be processed without printer reset.

A related method places a unique byte sequence, one that is assumed to not occur within the TIFF data, after each set of TIFF file data. Upon parsing an ENTER LANGUAGE= TIFF command, the parser begins routing bytes to the TIFF bypass transform. As bytes pass through, the parser continues to examine the print job byte sequence for an end sequence, e.g., one that begins with the characters @PJL. When the end sequence is detected, the parser stops sending bytes to the TIFF bypass transform and starts parsing PJL commands again.

Having the print assistant that generates the print job place some sort of check in the end sequence can decrease the probability that a random TIFF file byte sequence will match the end sequence. For instance, the end sequence could be @PJL ENDTIFF, [size], where size is the number of bytes to be sent to the TIFF bypass. The parser can verify that this is a correct end sequence by comparing a bypassed byte count to the value size.

One advantage to this first approach is that it requires no modification to the printing device's TIFF reader, and the print assistant on the client need not interpret or manipulate TIFF files at all. Also, since TIFF data can be directly written to the client port manager for the printing device, a separate physical spool file may not be required. This approach may not be available, however, for some printing devices that cannot provide PDL support for TIFF file delineation tags.

The second primary embodiment could work in a system with a PDL interpreter and TIFF bypass, but need not. This embodiment can work equally well without PDL encapsulation of TIFF data, as the created multiTIFF file looks like a valid TIFF file. But this multiTIFF file uses a proprietary IFD tag that allows a modified TIFF reader to "see" concatenated TIFF file data. In general, embedded TIFF files are supplemented in this embodiment with information that indicates whether the TIFF file is followed by another TIFF file.

In accordance with one approach under this embodiment, the proprietary tag is added to an existing IFD in a TIFF file—after that IFD is replicated and appended at the end of the TIFF file data. Replication is preferred for two reasons. First, it guarantees that extending the IFD by one DE will not throw off any other pointers within the file, as the new IFD is placed at the file end. Second, it conveniently allows the TIFF reader to find the end of the current file, i.e., the file ends with the four bytes that make up the Next IFD Offset pointer for the replicated IFD.

Figure 4:
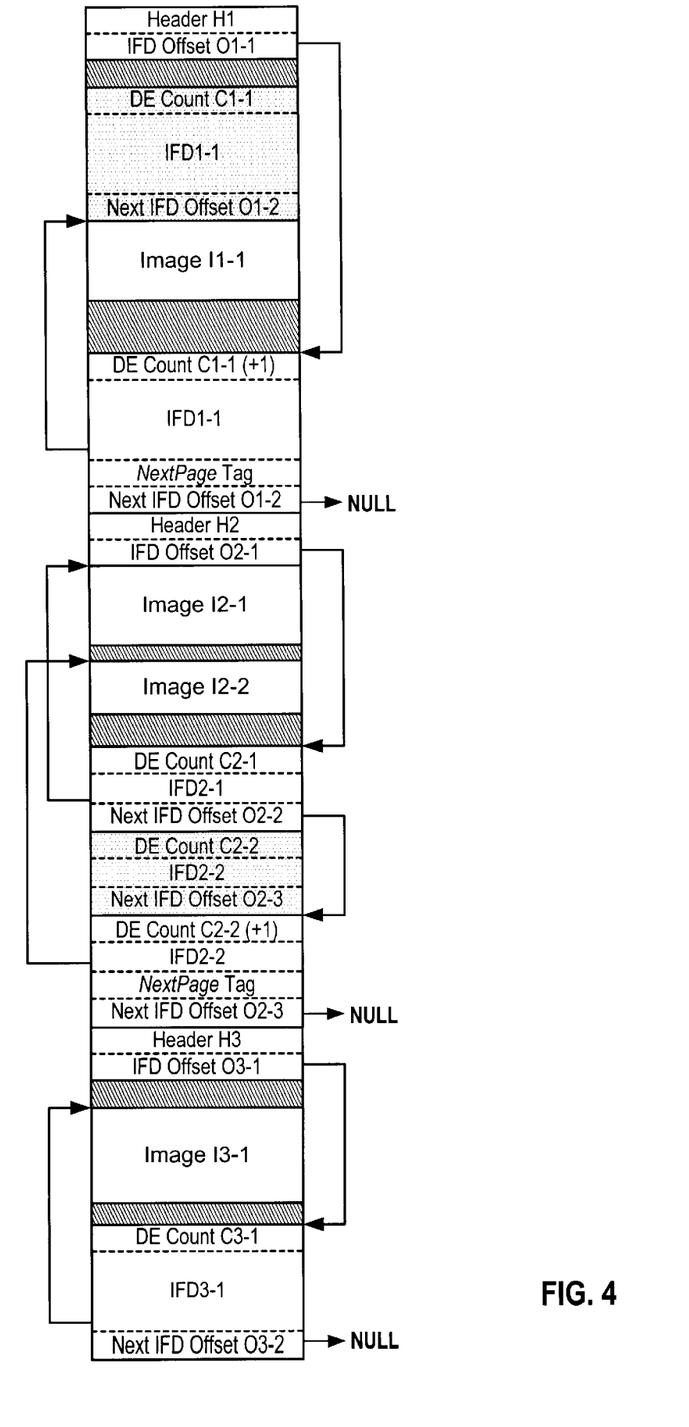

In the example shown in FIG. 4, the logical last IFD in each modified TIFF file is selected for replication by the process that creates the MultiTIFF file. The creating process quickly searches through the IFDs in file F1 until it finds the logically last IFD, e.g., the one with a NULL Next IFD Offset. For TIFF file F1, only one IFD exists (IFD1-1), and thus IFD1-1 is selected for replication. The offset to that IFD (in this case IFD Offset O1-1 in header H1) is modified in the print stream to contain the value size, where size is the original size in bytes of file F1. The remainder of the TIFF file data is copied to the output stream, with no other modifications.

Immediately following the TIFF file data in the output stream is the replicated version of IFD1-1. Since a new DE is to be appended to this IFD, DE Count C1-1 is incremented by one. The original DEs from IFD1-1 follow the modified DE Count. Immediately following the original DEs, the new IFD entry is placed in the output stream. This proprietary tag could be defined, e.g., as follows:

| | |
|---|---|
| Tag | Continuation |
| Data Type | BYTE |
| Count | 1 |
| Value | NextPage (Boolean TRUE) or EndJob (Boolean FALSE) |

Finally, the replicated IFD is terminated with its original Next IFD Offset value, which will always be NULL when the logical last IFD is replicated. It should be noted that the original IFD1-1 remains in the file, but is unused as it is no longer pointed to as an IFD.

TIFF file F2 is placed in the print stream immediately following the replicated IFD from TIFF file F1. Since F2 contains two IFDs, the header IFD offset O2-1 is unmodified. The Next IFD Offset O2-2 (in IFD2-1) is modified to contain the value size, where size is the original size of file F2. The second original IFD (IFD2-2) is replicated as described above and the Continuation:NextPage tag is added.

Since TIFF file F3 is the last file in the MultiTiff stream, one option is to pass through F3 unmodified, and let the TIFF reader assume that this is the last TIFF file since it contains no NextPage tag. This is the approach illustrated in FIG. 3. Another alternative is to modify a replicated version of IFD3-1 as described above, but add an explicit Continuation:EndJob tag.

The printer TIFF reader begins processing of the MultiTiff print job like it would any other TIFF file. But upon parsing the NextPage tag in replicated IFD1-1, the TIFF reader notes the byte offset that lies just past the NULL pointer in Next IFD Offset O1-2. The TIFF reader renders Image I1-1. It then resets its File Offset to zero, and moves its Begin of File Offset pointer to the noted byte offset. All other current print job settings are maintained. The TIFF reader then begins reading header H2 and interpreting data from TIFF file F2.

After rendering Images I2-1 and I2-2, the TIFF reader repeats its reset steps to move to TIFF file F3. Since F3 contains no NextPage tag, after rendering F3 and reaching the NULL pointer, a printer reset is performed. Of course, an explicit EndJob tag in the last IFD would accomplish the same thing. Since the continuation tags are proprietary, a TIFF reader that cannot recognize and process the proprietary tags will not generate an error, but will only print data from the first TIFF file.

It is also noted that the choice of the logical last IFD from each file for replication is merely exemplary. Any IFD could be chosen for replication, as long as the TIFF reader understands that the IFD containing the NextPage tag will also indicate the physical end of data from that TIFF file.

The third primary embodiment is similar in one way to the second embodiment—it uses replicated IFDs with proprietary tags. But unlike the second embodiment, a MultiTIFF file according to the third embodiment will generally not be readable except by a TIFF reader that comprehends the MultiTIFF format. This is because instead of having the reader reset its File Offset at the beginning of each new file data set, this format instructs the TIFF reader to set an offset adjustment value when it enters a part of the data stream that comes from a different TIFF file. Without comprehending this offset adjustment value, the TIFF reader would quickly encounter what appear to be invalid byte offsets.

Figure 5:
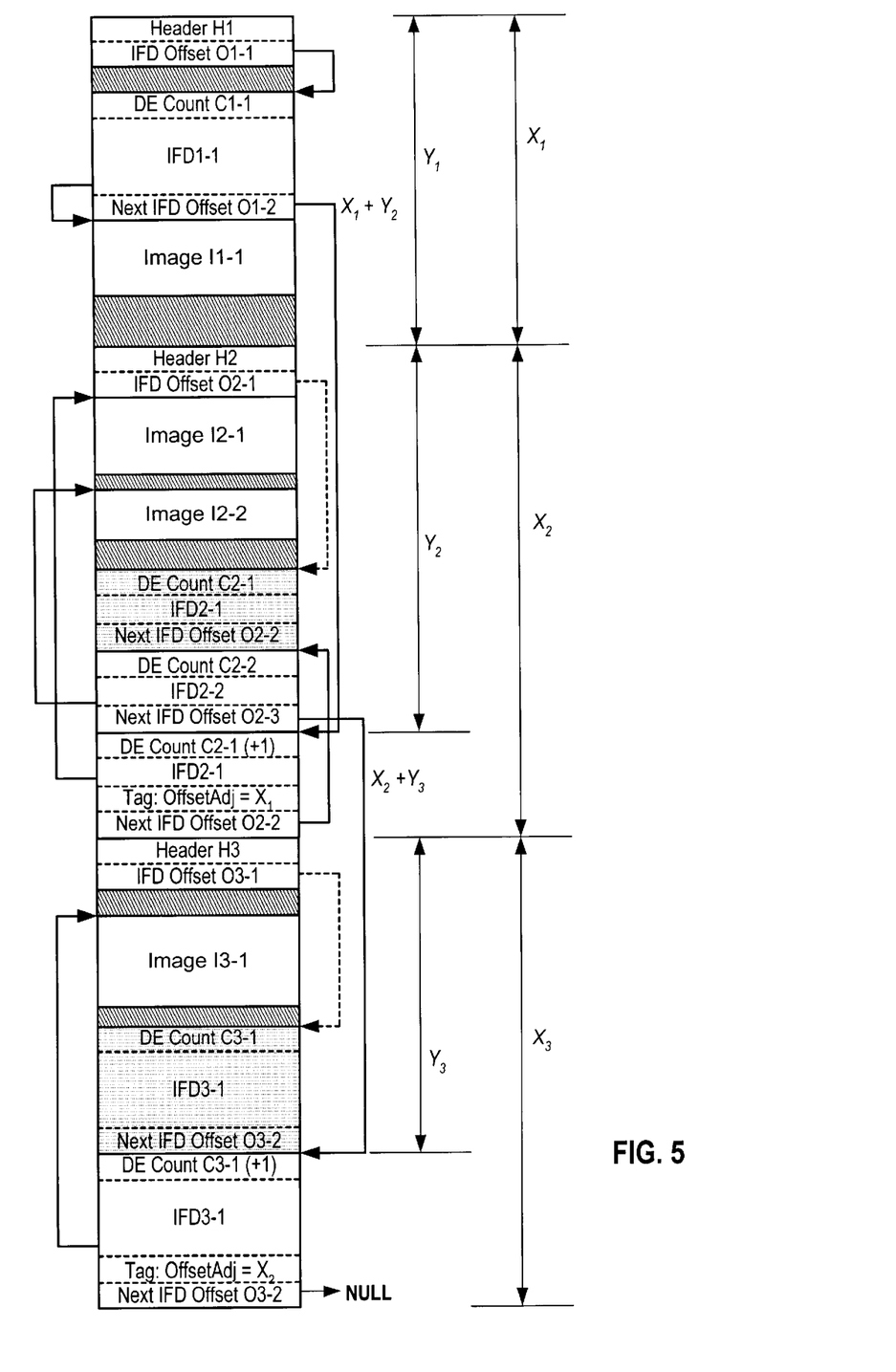

FIG. 5 depicts a TIFF data stream constructed according to one version of this embodiment. In this embodiment, during MultiTIFF data construction the first TIFF file data is passed through to the output stream with only one change— the NULL Next IFD Offset pointer from the last IFD (Offset O1-2) is altered to point instead to a new IFD inserted at the end of the second TIFF file, F2. This byte offset is easily calculated. It is equal $X_1+Y_2$, where $X_1$ is the size of F1 as placed in the data stream, and $Y_2$ is the original size of F2.

Like in the previous embodiment, this embodiment replicates an IFD, adds a tag, and places the replicated IFD at the end of the TIFF file data for that file in the data stream. In this case, the replicated IFD is the first IFD (IFD2-2) in TIFF file F2. The new tag has the following description:

| | |
|---|---|
| Tag | OffsetAdj |
| Data Type | LONG |
| Count | 1 |
| Value | $0 \ldots 2^{32} - 1$ |

The OffsetAdj tag indicates to a TIFF reader that it needs to adjust each offset it reads in the TIFF data from that point forward. Thus as shown in FIG. 5, the appended IFD2-1 contains an OffsetAdj tag with a value of $X_1$, the size occupied by file F1.

The printer TIFF reader begins processing of the FIG. 5 MultiTiff print job like it would any other TIFF file. This particular TIFF reader maintains an internal offset adjustment value, which is initialized to zero. Unlike a "standard" TIFF reader, the offset adjustment value is added to any offset extracted from the print stream.

Image I1-1 is rendered, and the reader then follows Next IFD Offset O1-2 to find the next IFD. Since this offset is from the head of the data stream, a byte offset value of $X_1+Y_2$ seeks to the bottom of original streamed file F2, to the new appended IFD2-1.

As IFD2-1 is parsed, the TIFF reader interprets the OffsetAdj tag, and adds the OffsetAdj value $X_1$ to its internal offset adjustment value. From that point forward, all offsets have their value adjusted by $X_1$ bytes before they are used. Thus even though none of the offsets internal to file F2 were modified in the print job, the reader compensates for the fact that each offset is $X_1$ bytes further into the file than indicated in the file data (due to F2's position in the print stream after F1).

Like the last Next IFD Offset pointer in file F1, the last Next IFD Offset pointer in file F2 is changed from NULL to a new value. The new value is the value required to seek to the bottom of original streamed file F3, to the new appended IFD3-1. Since this offset is already being adjusted within the reader by an internal value $X_1$, the remaining skip size is $X_2+Y_3$.

As IFD3-1 is parsed, the TIFF reader interprets another OffsetAdj tag, and adds the OffsetAdj value $X_2$ to its internal offset adjustment value, so that that value is now $X_1+X_2$. The reader now compensates correctly for the byte offsets in the third file. This process can be continued indefinitely to concatenate more TIFF files to the end of F1, F2, and F3.

Although not illustrated, the first file can contain a replicated IFD with an appended OffsetAdj=0 tag. Such a tag can be used to notify the TIFF reader that it should prepare to use the internal offset adjustment value.

It is noted that headers H2 and H3 still exist in the print stream but are at least initially bypassed during TIFF reading. Although likely to be uncommon, one conceivable problem with this embodiment may arise if not all files in the MultiTiff stream use the same byte ordering, since an IFD will be read incorrectly if byte-swapped. If an implementation addresses this issue, a new proprietary tag can be used in the logical last IFD of the first of two adjacent files in the stream, whenever the two files have different byte ordering. The proprietary tag alerts the TIFF reader that, starting with the next IFD, byte ordering should be reversed.

Although FIG. 5 illustrates the IFD in the second file containing the OffsetAdj instruction, there is nothing to prevent a protocol definition that places the OffsetAdj instruction in the first file, i.e., one that is interpreted as an "upon jumping to next IFD set offset adjustment" instruction. An instruction with such a meaning could be given a different tag, e.g., a NextOffsetAdj tag.

The printer TIFF reader is preferably part of the printer firmware, and consists, e.g., of a baseline TIFF reader as defined in Revision 6.0 of the TIFF specification, with additional support for one or more of the multiTIFF extensions described herein.

The client process that creates a MultiTIFF print stream can be embedded in one of several processes running on a client, or can be its own process, e.g., a standalone print assistant. When embedded, MultiTIFF print stream creation can be included in an application, a background process, a printer driver, a spooler, or a print processor.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. It is acknowledged herein that other equivalent tag schemes can be devised to assist a TIFF reader and/or PDL interpreter in processing multiple concatenated TIFF files. It is also acknowledged that the PDL interpreter embodiments could allow multiple TIFF file data to be printed in the same file with other print data that requires interpretation. Such minor modifications are encompassed within the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A method of printing multiple TIFF files, the method comprising:
   concatenating image and image pointer data from first and second TIFF files into a single print job; and
   adding tag data to the print job, the tag data containing information that allows a printer to recognize and process the second TIFF file data.

2. The method of claim 1, wherein adding tag data comprises inserting printer job language commands into the print job, at least one command indicating when a printer should enter TIFF mode.

3. The method of claim 2, further comprising including, within at least one of the printer job language commands, information keyed to the length of the first TIFF file.

4. The method of claim 2, further comprising including, within the printer job language commands, information keyed to the length of each TIFF file.

5. The method of claim 4, wherein the information keyed to the length of each TIFF file is included in a printer job language command immediately preceding the TIFF data for that TIFF file.

6. The method of claim 2, further comprising placing a tag byte sequence at the end of the first TIFF file data to delineate the end of that TIFF file.

7. The method of claim 1, wherein adding tag data comprises:
replicating an original Image File Descriptor (IFD), present in one of the TIFF files, as a new IFD at the end of the image and image pointer data from that TIFF file;
adjusting a pointer to the original IFD to point instead to the new IFD; and
adding the tag data to the new IFD.

8. The method of claim 7, wherein the original IFD is the logical last IFD in the first TIFF file, and wherein the tag data comprises an IFD directory entry signaling that another TIFF file follows the new IFD.

9. The method of claim 8, comprising concatenating image and image pointer data from more than two TIFF files, wherein replicating the logical last IFD, adjusting a pointer, and adding an IFD directory entry signaling that another TIFF file follows the new IFD, are performed for each TIFF file followed by another TIFF file.

10. The method of claim 7, wherein the tag data comprises a new IFD entry describing a pointer offset adjust value based at least in part on the length of the first TIFF file, the method further comprising modifying the first TIFF file logical last Next IFD Offset pointer from a NULL value to a value that can be used to reach the logical first IFD of the second TIFF file.

11. The method of claim 10, wherein the original IFD is selected from the logical last IFD in the first TIFF file and the logical first IFD in the second TIFF file, and the pointer offset adjust value indicates the length of the first TIFF file.

12. The method of claim 10, comprising concatenating image and image pointer data from more than two TIFF files, wherein replicating an original IFD, adjusting a pointer, and adding a pointer offset adjust value, are performed for each pairing of adjacent TIFF files.

13. The method of claim 12, wherein the pointer offset adjust value indicates the length of all TIFF files up to and including the first TIFF file of each pairing.

14. A method of processing a print job containing concatenated image and image pointer data from first and second TIFF files, the method comprising:
rendering image data corresponding to the first TIFF file;
recognizing tag data within the print job, the tag data indicating that the print job TIFF data continues beyond the data from the first TIFF file;
adjusting print parameters according to the tag data to allow TIFF reading of data corresponding to the second TIFF file; and
rendering image data corresponding to the second TIFF file.

15. The method of claim 14, wherein recognizing tag data comprises, in an interpret mode, interpreting a printer job language command that identifies a TIFF file and its size, and adjusting print parameters comprises passing an amount of data equal to the indicated size through a TIFF bypass path, and then reentering the interpret mode.

16. The method of claim 15, wherein the print job contains concatenated image and image pointer data from more than two TIFF files, wherein interpreting a printer job language command that identifies a TIFF file and its size, passing an amount of data equal to the indicated size through a TIFF bypass path, and then reentering the interpret mode are repeated for each TIFF file.

17. The method of claim 14, wherein recognizing tag data comprises, in an interpret mode, interpreting a printer job language command that identifies a TIFF file, and in a TIFF mode, examining data passed through to a TIFF reader for the presence of a specified end TIFF file sequence.

18. The method of claim 14, wherein the tag data exists in one or more TIFF data IFD entries.

19. The method of claim 18, wherein adjusting print parameters according to the tag data comprises resetting file pointer values to reference from the beginning of the second TIFF file data, without resetting the printer.

20. The method of claim 18, wherein adjusting print parameters according to the tag data comprises setting a pointer offset adjust value according to the tag data, and accounting for the pointer offset adjust value in reading pointer values from the second TIFF file data.

21. The method of claim 20, further comprising when the print job contains image and image pointer data from more than two TIFF files, accumulating additional tag data pointer offset adjust values for each set of TIFF file data beyond the second.

22. A print device capable of rendering TIFF data, comprising:
a print engine having a TIFF reader, the print engine having the capability to process a print job comprising image and image pointer data from multiple concatenated TIFF files, and
tags instructing the print engine how to read the concatenated TIFF file data; and
a marking engine to print processed data received from the print engine.

23. The print device of claim 22, the print engine comprising a printer job language interpreter having a TIFF bypass pipeline to the TIFF reader, the printer job language interpreter having the capability to:
read, within the print job, a print job language tag containing a TIFF size value;
divert an amount of data equal to the TIFF size value, and following the print job language tag, to the TIFF bypass pipeline; and
interpret a printer job language command, from the same print job, following the diverted data.

24. The print device of claim 22, the print engine comprising a printer job language interpreter having a TIFF bypass pipeline to the TIFF reader, the printer job language interpreter having the capability to:
read, within the print job, a print job language tag indicating that following data is TIFF data;
divert data following the print job language tag to the TIFF bypass pipeline;
while diverting data, examine the diverted data for the presence of an end TIFF byte sequence, and upon finding that byte sequence, cease diverting data; and
interpret a printer job language command, from the same print job, following the diverted data.

25. The print device of claim 22, the TIFF reader having a file reset mode that responds to tags inserted in an IFD entry by resetting internal file pointers without resetting the print engine.

26. The print device of claim 22, the TIFF reader having a pointer offset adjust register that contains a value to be added to pointers extracted from TIFF data, the TIFF reader capable of setting the pointer offset adjust register value in response to tags inserted in an IFD entry.

27. A print assistant comprising:
a TIFF data concatenator to place TIFF data from multiple TIFF files in a common print data stream; and
a tag insertion module to place tags in the print data stream, the tags containing instructions, to a print engine, needed to read the concatenated TIFF data.

28. The print assistant of claim 27, the tag insertion module placing the tags in printer job language commands interspersed between the data from multiple TIFF files.

29. The print assistant of claim 27, wherein the tag insertion module comprises an IFD replicator to replicate one or more IFDs in the TIFF data, and an IFD pointer adjust module to adjust existing IFD pointers in the TIFF data to point to the replicated IFDs, the tag insertion module inserting the tags in new IFD entries within the replicated IFDs.

30. An apparatus comprising a computer-readable medium containing computer instructions that, when executed or interpreted by a processor, cause the processor to perform a method of printing multiple TIFF files, the method comprising:

concatenating image and image pointer data from first and second TIFF files into a single print job; and adding tag data to the print job, the tag data containing information that allows a printer to recognize and process the second TIFF file.

* * * * *

UNITED STATES PATENT AND TRADEMARK OFFICE
CERTIFICATE OF CORRECTION

PATENT NO. : 6,672,212 B1 Page 1 of 1
DATED : January 6, 2004
INVENTOR(S) : Ferlitsch It is certified that error appears in the above-identified patent and that said Letters Patent is hereby corrected as shown below:

Title page,
Item [56], References Cited, OTHER PUBLICATIONS, should include
-- Adobe Developers Association; "TIFF-Revision 6.0," June 3, 1992; pp. 1-21. --.

Signed and Sealed this

Fifteenth Day of March, 2005

JON W. DUDAS
*Director of the United States Patent and Trademark Office*